P. LYNCH & H. WOCHNER.
MAGNET CHARGER.
APPLICATION FILED MAY 15, 1914.
1,153,127.  Patented Sept. 7, 1915.
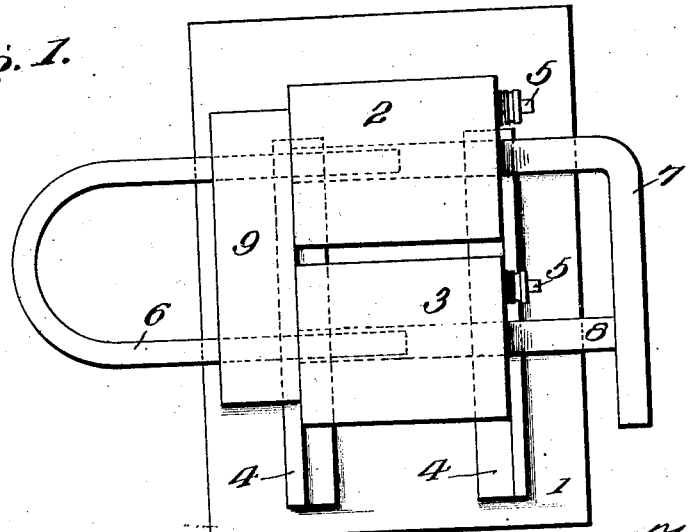
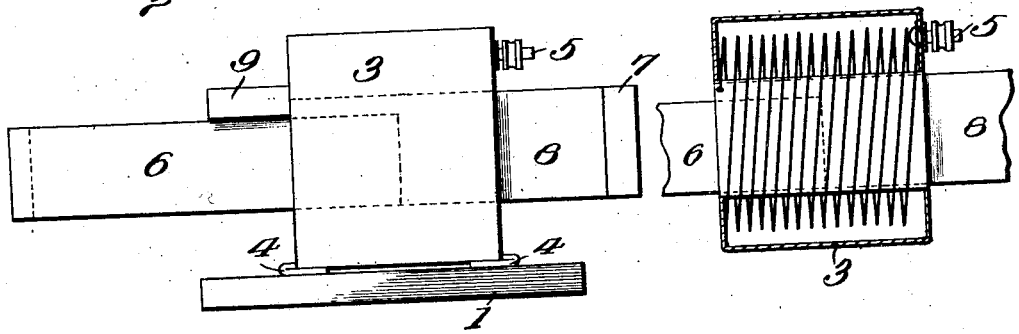
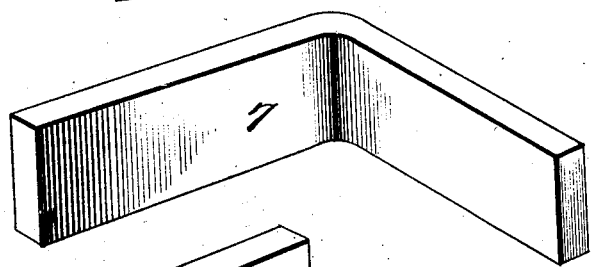
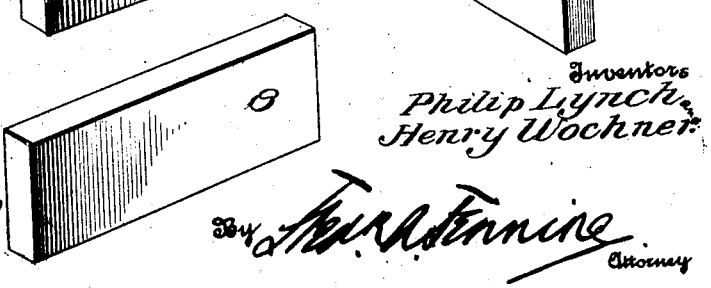
Inventors
Philip Lynch,
Henry Wochner

UNITED STATES PATENT OFFICE.

PHILIP LYNCH AND HENRY WOCHNER, OF ROCK ISLAND, ILLINOIS.

MAGNET-CHARGER.

1,153,127.

Specification of Letters Patent. Patented Sept. 7, 1915.

Application filed May 15, 1914. Serial No. 838,851.

*To all whom it may concern:*

Be it known that we, PHILIP LYNCH and HENRY WOCHNER, of Rock Island, in the county of Rock Island and State of Illinois, have invented certain useful Improvements in Magnet-Chargers; and we do hereby declare the following to be a full, clear, and exact description of the invention, such as will enable others skilled in the art to which it appertains to make and use the same.

The primary object of this invention is to provide a simple and highly efficient apparatus for electrically charging permanent magnets of magneto-generators.

A further object is to enable magnets of different sizes to be charged with equal facility; and further objects are to prevent loss of magnetism after the current from the charger has been discontinued; and also means for completing the circuit between the poles of the permanent magnet while being charged.

In the accompanying drawings, Figure 1 is a plan view. Fig. 2 is an end elevation. Fig. 3 is a sectional view through one of the coils. Figs. 4 and 5 show the separate contacting members for coöperating with the magnet poles.

Referring to the drawings, 1 designates a base whereon is mounted a permanent coil 2 and a sliding coil 3, the casings of the two coils being electrically connected through the agency of guides 4 mounted on base 1 and whereon the coil 3 may readily slide in either direction. Each coil is located in a casing having a central opening therethrough, and one end of the coil wire is soldered to the core and the other to the insulated terminal 5. To these terminals of the two coils are connected wires leading from a generator (not shown) and which may consist of dry cells, a storage battery, or any source of direct current of six volts, or thereabout. Into the central openings of these coils are designed to fit the poles of a permanent magnet 6, as shown in Figs. 1 and 2, and which magnet is to be charged through the instrumentality of the coils. In order to complete the circuit between the pole pieces the two coils are provided with coöperating contacting members 7 and 8, the former, which is of L-shape, being mounted in the permanent coil 2, while the member 8, which is mounted in the coil 3, consists of a single straight piece of metal. This latter is designed to contact with that portion of the member 7 which parallels the casings of the two coils. Such paralleling portion is sufficiently long so that a part thereof will always intersect the axis of the opening in the movable coil, thus insuring contact between the members in the various positions into which the coil 3 may be adjusted. The two contacting members 7 and 8 are movable longitudinally of their respective coils to insure contact with magnets of different lengths, and they are relatively adjustable while still permitting contact between themselves. Whatever be the position of the coil 3 the electrical connection is always maintained between the two coils through guides 4. Under ordinary conditions a permanent magnet may be fully charged in less than one minute. After the magnet has been fully charged and before removing it from the coils a conductor bar 9 is placed upon the two poles of the magnet, and such bar is retained on the magnet until the latter has been placed in position on the magneto, thus insuring the retention of the magnetism.

In practice, the sliding coil 3 is adjusted relatively to the permanent coil, according to the size of the magnet to be energized, and the poles of the magnet are inserted into the two coils until their ends contact with the ends of the contacting members 7 and 8. Care must be taken to see that these members 7 and 8 are in engagement with each other so as to maintain the circuit between the poles of the magnet. Ordinarily current for charging the permanent magnet need not be applied for longer than thirty seconds, and frequently less time will suffice. As before stated, after the current is discontinued the bar 9 is placed on the pole pieces of the magnet and retained thereon until the latter is mounted in the magneto. The bar 9 need not necessarily be placed in position until after the magnet has been withdrawn from the coils.

We claim as our invention:

1. A magnet charger comprising a base, a fixed coil and an adjustable coil, said coils having openings to accommodate the poles of a permanent magnet, intersecting members carried by said coils, and guiding means for the adjustable coil forming electrical connections between the two coils.

2. A magnet charger comprising a base, a fixed coil, and an adjustable coil, said coils having openings to accommodate poles of a permanent magnet, guiding means for the adjustable coil forming electrical connections between the two coils, and contacting members carried by the coils and with which the poles of the magnet are designed to engage, said contacting members being designed to maintain contact in the different relative positions of the coils.

In testimony whereof, we have signed this specification in the presence of two subscribing witnesses.

PHILIP LYNCH.
HENRY WOCHNER.

Witnesses:
E. W. SCHOEDE,
N. M. DRIGGS.